United States Patent [15] 3,646,805
Walters [45] Mar. 7, 1972

[54] ULTRASONIC FLAW DETECTION CIRCUIT

[72] Inventor: William T. Walters, Houston, Tex.
[73] Assignee: AMF Incorporated
[22] Filed: Oct. 3, 1969
[21] Appl. No.: 863,599

[52] U.S. Cl............................................73/67.9, 73/67.85
[51] Int. Cl......................................................G01n 29/04
[58] Field of Search.................................73/67.7–67.9, 71.5

[56] References Cited

UNITED STATES PATENTS 2,527,986   10/1950   Carlin......................................73/67.8
2,592,134   4/1952    Firestone................................73/67.8
3,379,051   4/1968    Zeutschel et al........................73/67.9

FOREIGN PATENTS OR APPLICATIONS 933,564    8/1963    Great Britain...........................73/67.9

Primary Examiner—Richard C. Queisser
Assistant Examiner—Arthur E. Korkosz
Attorney—George W. Price and John H. Gallagher

[57] EXEMPLARY CLAIM

1. Ultrasonic inspection apparatus for directing ultrasonic energy into a member to be inspected and for producing output signals only during that time when true flaw signals would be expected to occur, the apparatus comprising:
 a source of recurring pulses,
 a first transducer coupled to said source of recurring pulses for producing corresponding pulses of ultrasonic energy, said transducer directing ultrasonic pulses along a single path that is oblique to a near surface of the member and also producing flaw pulses in response to received ultrasonic pulses reflected from flaws within said member,
 a second transducer located adjacent said near surface and disposed to receive pulses of ultrasonic energy transmitted by the first transducer along said path and reflected from the near surface, said second transducer producing near surface reflected pulses in response to the received ultrasonic pulses reflected from the near surface,
 means coupled to said source of recurring pulse for producing a gating pulse at a time after the occurrence of each transmitted ultrasonic pulse, each gating pulse having a time duration that includes the expected time of arrival at said second transducer of an ultrasonic pulse feflected from the near surface,
 a first gating means for gating each near surface reflected pulse that occurs simultaneously with a gating pulse,
 means responsive to near surface reflected pulses passed by the first gating means for producing corresponding flaw gating pulses,
 said flaw gating pulses having a time duration to include the expected time of arrival of a corresponding ultrasonic pulse received at the first transducer after having been reflected from a flaw in said member,
 a flaw gate coupled to said first transducer and controlled by said flaw gating pulses for passing flaw pulses from said first transducer, and
 output means responsive to the occurrence of flaw pulses passed by said flaw gate.

8 Claims, 3 Drawing Figures

PATENTED MAR 7 1972 3,646,805
SHEET 1 OF 2
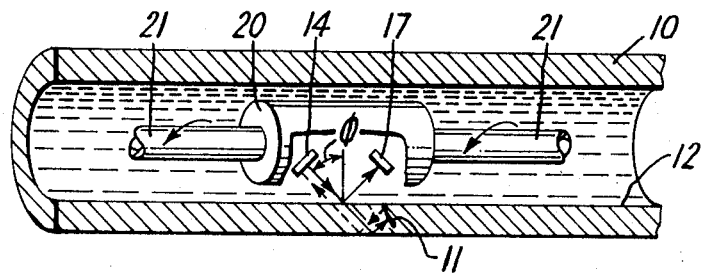
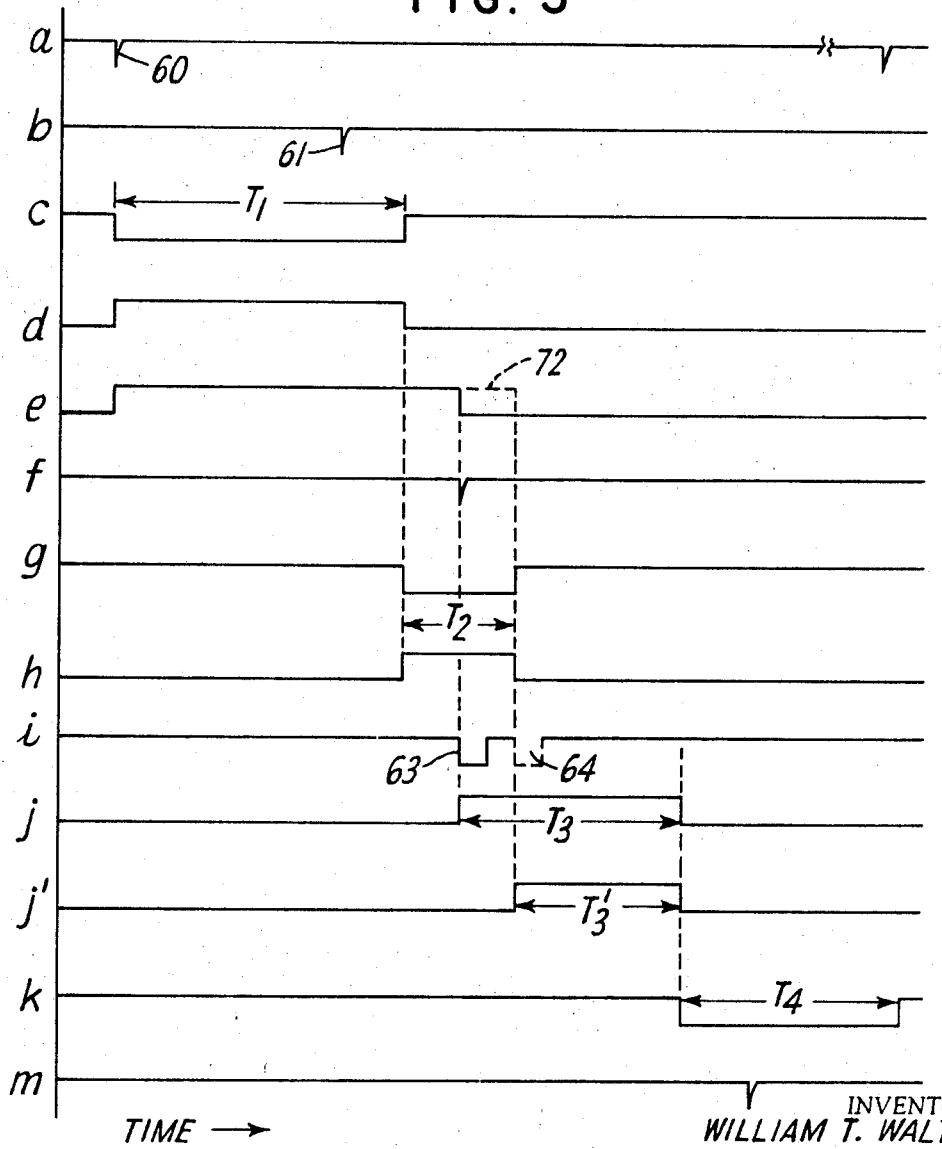
INVENTOR
WILLIAM T. WALTERS
BY
John H. Gallagher
ATTORNEY 3,646,805

ULTRASONIC FLAW DETECTION CIRCUIT

BACKGROUND OF THE INVENTION

In the manufacture of some types of structural members, and/or as a result of the use to which structural members are put, anomalies or flaws, may occur in the body of the member. It is common to nondestructively inspect structural members with ultrasonic inspection apparatus to detect the presence of such flaws. The ultrasonic energy may propagate in a solid material as longitudinal waves or as shear waves. The desirability of having the ultrasonic energy propagate as longitudinal or shear waves, or both, depends upon a number of different considerations. As an example, it has been found that in the ultrasonic inspection of a walled member such as a pipe, ultrasonic energy propagating as longitudinal waves that are directed normally to the surface of the pipe wall will not always be sufficiently reflected from an anomaly that also extends substantially normally to the surface to produce a flaw signal in the electronic circuitry of the inspection apparatus. With flaws of this type, ultrasonic energy propagating in the wall of the pipe as shear waves is more effective to produce a reflected signal, and thus more accurate inspection results are achieved.

A coupling medium such as water commonly is used to improve the coupling of the ultrasonic energy from a transducer into the body of the member being inspected. Because water is a nonelastic medium it cannot support the propagation of ultrasonic shear waves. Consequently, the ultrasonic transmitting transducer must generate longitudinal waves that propagate through the water-coupling medium. These longitudinal waves are directed along a path which intersects the surface of the inspected pipe at the appropriate oblique angle of incidence so that the energy entering the wall of the pipe experiences a conversion of its propagating mode to that of shear waves. As is well understood, the angle of incidence at which optimum mode conversion occurs is a function of a number of different factors. For a water-steel interface, wherein the steel is of a grade commonly used in pipe manufactured for use in oil field operations, the angle of incidence that will produce optimum mode conversion from longitudinal to shear waves is approximately 18½°.

In the operation of the electronic circuitry of pulsed ultrasonic inspection apparatus, gating means are used to assure that output flaw signals may be produced only during the time period that a reflection of ultrasonic energy is expected to be received from a flaw in the wall of the pipe. The elapsed time between the occurrence of a transmitted pulse and the beginning of a gating pulse is substantially equal to the round trip propagation time of transmitted ultrasonic energy that is reflected from the near surface of the pipe. If such a reflection of energy is received back at the transmitter transducer, the received energy may be utilized to commence the operation of appropriate circuitry that ultimately produces the desired gating pulse. However, no such near surface reflection is received back at the transmitting transducer when the transmitted ultrasonic energy is incident on the near surface at an angle such as 18½°. Therefore, other arrangements must be provided for initiating the timing operation in the electronic circuitry.

It is not acceptable to continuously operate with a fixed time delay before beginning the gating pulse unless it is certain that the spacing between the ultrasonic transducer and the near surface of the pipe will remain constant during the entire time the pipe is being inspected. This condition is difficult to achieve when it is necessary to have relative motion between the ultrasonic transducer and the inspected pipe.

SUMMARY OF THE INVENTION

In accordance with the present invention, ultrasonic inspection apparatus is provided that overcomes the difficulties mentioned above and will produce accurate inspection results, particularly when inspecting for flaws that extend normally to the wall of the member being inspected. The apparatus includes a transceiver ultrasonic transducer and a receiving ultrasonic transducer. The transceiver transducer receives recurring clock pulses and in response thereto transmits pulses of ultrasonic energy which propagate through a water-coupling medium as longitudinal waves. These waves are incident at an oblique angle on the near surface of the member being inspected so that mode conversion occurs and the ultrasonic energy propagates within the member as shear waves. Ultrasonic energy that encounters a flaw within the member is reflected back to the transceiver transducer which produces an electronic flaw signal in response thereto.

Some transmitted ultrasonic energy is reflected directly from the near surface of the member and is received by the separate receiving ultrasonic transducer.

Electronic flaw-detecting circuitry responds to the clock pulses by producing corresponding delayed gating pulses which commence after the termination of corresponding transmitted ultrasonic pulses. The delayed gating pulses have a time duration to include the time period during which near surface reflections are expected to be received by the receiving transducer. Gating means under control of the delayed gating pulses passes the near surface reflected pulses which in turn produce flaw gating pulses that enable a flaw gate to pass only the reflected flaw pulses received by the transceiving transducer. Means are included in the circuitry to enable the flaw gate to pass flaw pulses even though a near surface reflection is not received from a transmitted pulse, or in the event that flaw gating pulses are not properly generated due to circuit malfunction.

BRIEF DESCRIPTION OF THE DRAWINGS

FIG. 1 is a simplified illustration of ultrasonic inspection apparatus in which the present invention is particularly useful;

FIG. 3 is a series of waveforms used in explaining the operation of the circuitry of FIG. 2.

DESCRIPTION OF PREFERRED EMBODIMENT

Figure 2:
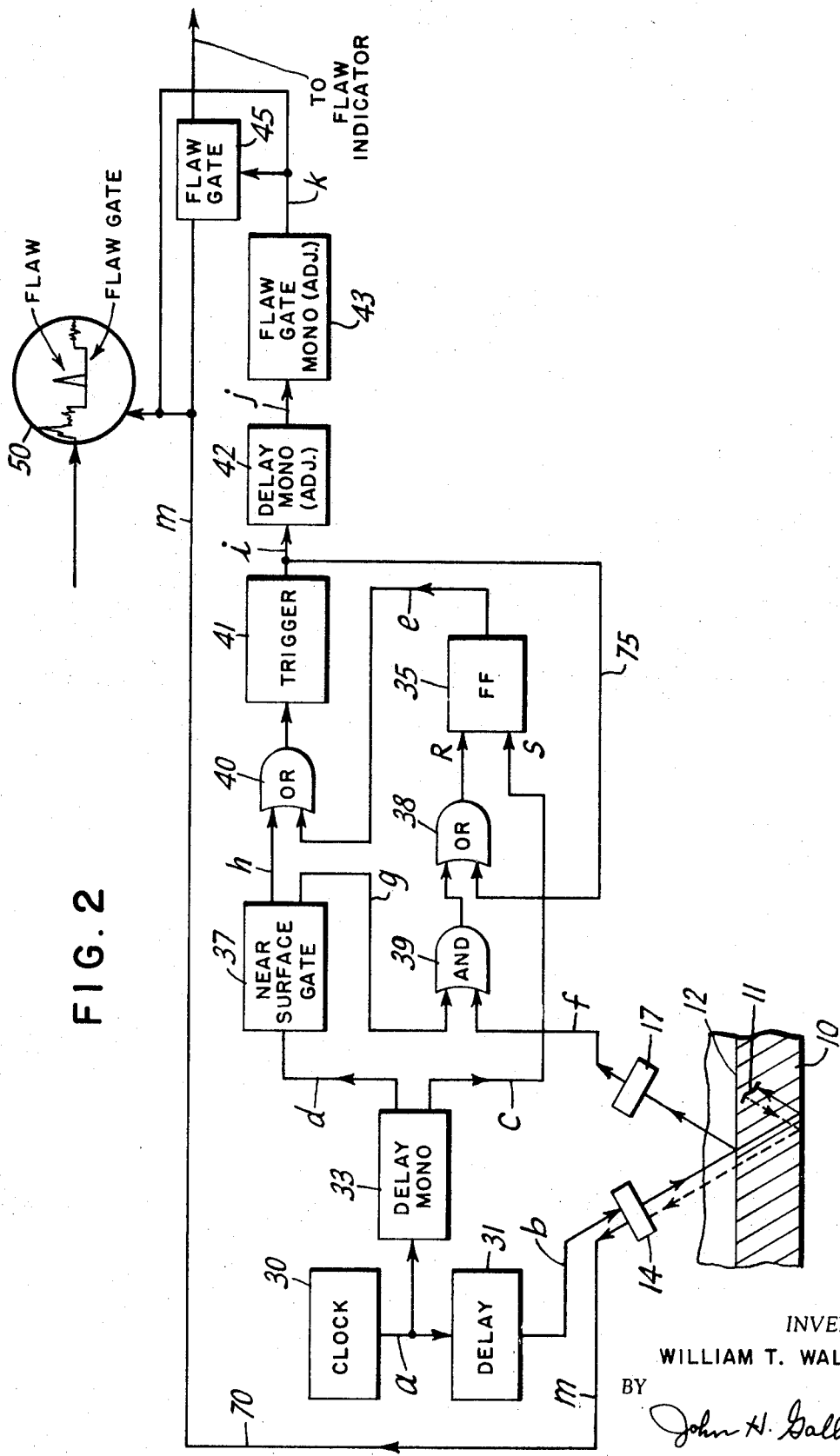
FIG. 2 is a block diagram illustrating the electrical flaw-detecting circuitry of this invention.

In describing the invention, reference first will be made to FIG. 1 of the drawings which illustrates in simplified form inspection apparatus in which the ultrasonic flaw-detecting circuitry of this invention is particularly useful. A tubular member 10 such as a steel pipe is to be inspected for flaws in its walls. A flaw 11 is shown as a crack that extends generally transversely to the inner surface 12 of the pipe. It previously was mentioned that ultrasonic energy directed normally into the pipe wall and propagating therein as longitudinal waves is not entirely successful in detecting a flaw such as illustrated at 11. I therefore desire that the ultrasonic energy propagate within the wall of pipe 10 in a shear wave propagating mode.

Pipe 10 is completely filled with an ultrasonic energy coupling fluid such as water, by means not illustrated. Because water will not support the propagation of ultrasonic shear waves, transceiving ultrasonic transducer 14 transmits pulses of ultrasonic longitudinal waves that are incident on the inner surface 12 at an oblique angle of incidence $\phi$ which achieves substantial mode conversion of the ultrasonic energy into shear waves that propagate in the wall of pipe 10. There will be some reflection of the transmitted longitudinal waves from the inner surface 12, and these near surface reflected waves are received at receiving transducer 17. Ultrasonic shear waves that propagate within the wall of pipe 10 will be reflected from the outer surface of pipe 10 and then will be incident on flaw 11. The shear waves will be reflected from flaw 11 and will return back to transceiving transducer 14, as illustrated in FIG. 1. In returning to transducer 14, the shear waves will be converted to longitudinal waves at the steel-water interface since the mode conversion is a bilateral effect at the interface.

The centrally disposed transducer carrier 20 and supporting shafts 21 are helically translated through the pipe during the inspection operation by means not illustrated. Because of mechanical considerations associated with the helically translated transducer carrier 20 and because of the nonuniformity of the pipe, some wobble or eccentricity in the helical translation of carrier 20 will be present. Consequently, it is virtually impossible to maintain constant radial spacing between transducers 14 and 17 and the inner surface 12 of the pipe during their relative helical translation.

It is necessary to gate the electronic flaw-detecting circuitry so that output signals will be passed to indicating means only during the time that reflections of ultrasonic energy are expected to be received at transceiver transducer 14 after having been reflected from a flaw 11 in the wall of the pipe. Because transducer 14 wobbles during its helical translation, the propagation time of ultrasonic energy propagating to and from a flaw will vary. This variation in propagation time arises solely in the portion of the propagation path between transducer 14 and inner surface 12. However, substantially the same variation of propagation time will be experienced by the longitudinal waves reflected from the inner, or near, surface 12 and received by receiving transducer 17. Therefore, with the arrangement illustrated in FIG. 1, a near surface reflected pulse of ultrasonic energy received at transducer 17 may be used to actuate appropriate gating circuitry and the problem created by the wobble or eccentricity of the transducers inherently is overcome.

The electronic flaw-detecting circuitry associated with transducers 14 and 17 is illustrated by the block diagram of FIG. 2. The circuitry included in the various blocks may be of conventional design and of the type commonly used in pulsed systems of this general type. It will be assumed that the pulsed circuits are triggered when one or more input signals assumes the lower of two magnitudes, or levels, this mode of triggering being a matter of design choice.

A clock pulse source 30 produces short duration regularly recurring clock pulses, FIG. 3a, which are coupled through a delay means 31 whose output is a corresponding regularly recurring series of pulses, FIG. 3b, which trigger transceiver transducer 14. Transceiver transducer 14 produces corresponding pulses of ultrasonic energy that are directed toward near surface 12 of pipe 10 in the manner previously described.

The clock pulses of FIG. 3a also are coupled to delay monostable multivibrator 33. Clock pulse 60 of FIG. 3a triggers delay monostable multivibrator 33 whose unstable state persists for a time duration T1, FIG. 3c. Delay monostable multivibrator 33 returns to its stable state a short time after transceiver transducer 14 is triggered by pulse 61 of FIG. 3b. A first output, FIG. 3c, is taken from delay monostable multivibrator 33 and is coupled to the SET-input of flip-flop circuit 35. The leading edge of the negative going pulse of FIG. 3c sets flip-flop 35 into its first stable state, FIG. 3e.

A second output, FIG. 3d, is taken from delay monostable multivibrator 33 and is coupled to near surface gate 37 which also is a monostable multivibrator. Near surface gate 37 is not triggered at this time by the waveform of FIG. 3d because this signal now is at the higher of its two levels. However, when the pulse waveform of FIG. 3d changes to its lower level, the trailing edge of the pulse will trigger near surface gate 37, one of whose outputs is the waveform of FIG. 3g. The unstable state of near surface gate 37 has a time duration $T_2$ which is chosen to include the expected time of arrival at receiving transducer 17 of a pulse of ultrasonic energy after having been reflected from the near surface 12 of pipe 10. A near surface reflected pulse received at receiving transducer 17 is illustrated in FIG. 3f.

The signals of FIGS. 3f and 3g are coupled as inputs to AND-gate 39 and since both signals are at their lower levels and since they are present simultaneously, the pulse of FIG. 3f will be passed through AND-gate 39, will pass through OR-gate 38, and will be coupled to the RESET input terminal of flip-flop 35 to trigger flip-flop 35 back to its first stable state, as seen in FIG. 3e. The output of flip-flop 35 is coupled through OR-gate 40 to the input terminal of trigger circuit 41, and since the waveform of FIG. 3e is at the lower of its two levels after returning to its first stable state, this change of state triggers trigger circuit 41. It will be seen by comparing the waveforms of FIGS. 3a, 3b, 3g, and 3f, that near surface gate 37 disables AND-gate 39 until after the clock pulse 60, the delayed pulse 61, and the transmitted pulse of transducer 14 have already occurred. This minimizes false triggering of AND-gate 39 and permits it to be triggered only by a near surface reflected pulse received at transducer 17.

Trigger circuit 41 is a monostable multivibrator having a short duration unstable state, as illustrated by pulse 63 in FIG. 3i. Trigger pulse 63 is coupled over lead 75 and passes through OR-gate 38 to the reset terminal of flip-flop 35. Pulse 63 has no effect on flip-flop 35 at this time because it already has bee reset by the near surface reflected pulse of FIG. 3f.

The trigger pulse 63 of FIG. 3i also is coupled to delay monostable multivibrator 42 which produces the positive pulse of FIG. 3j in response to the leading edge of the trigger pulse. The time period $T_3$ of the unstable state of delay multivibrator 42 is adjustable for reasons to be explained below.

After the time period $T_3$, delay multivibrator 42 returns to its stable state and the negative going trailing edge of the pulse of FIG. 3j triggers flaw gate monostable multivibrator 43 which produces the negative gating pulse of FIG. 3k. The time duration $T_4$ of the flaw gate pulse of FIG. 3k also is adjustable, as will be explained.

The flaw gate pulse of FIG. 3k is coupled to one input terminal of flaw gate 45 and enables, or opens, that gate during the time interval $T_4$ that a true flaw signal, FIG. 3m, is expected to be received from a flaw within the wall of pipe 10. A true flaw signal, such as that of FIG. 3m, thus is passed by flaw gate 45 and is coupled to an appropriate flaw indicator or some other apparatus which is intended to function in response to flaw signals. Flaw gate 45 is closed during all other times so that false flaw signals are not passed there-through. The output of flaw gate multivibrator 43 and the flaw signal of FIG. 3m on line 70 may be monitored by an oscilloscope 50 which is connected in a known manner to provide an indication such as illustrated in FIG. 2 wherein the flaw signal is shown positioned within the flaw gate signal. The recurring horizontal sweep voltage for the oscilloscope 50 may be produced by a sawtooth generator which functions in response to the output of clock pulse generator 30.

By comparing the waveforms of FIGS. 3f, 3k, and 3m it will be seen that flaw gate 45 will first be opened only after a near surface reflection has been received at receiving transducer 17 and will remain open only for the interval of time during which a true flaw signal would be expected to be received at transceiver transducer 14. Consequently, even though the separation between transducers 14 and 17 and the inner surface 12 of pipe 10 may change due to wobble of the mechanical system, as explained above, flaw gate 45 never will be opened prior to the time that a true flaw signal may be expected to be received at transceiving transducer 14. This operation obviously reduces the possibility of false triggering of flaw gate 45.

When the electronic system of FIG. 2 is properly functioning with an inspection arrangement as illustrated in FIG. 1, the positions of the flaw gate and the flaw signal, if present, on the face of oscilloscope 50 will slide back and forth horizontally. This arises because the horizontal sweep voltage is a regularly recurring signal having an unchanging rate as determined by clock pulse generator 30, but the time intervals between the occurrence of the clock pulses and the appearances of the flaw gate and flaw signals will vary as a function of the wobble of rotating transducer carrier 20 and/or as a function of the eccentricity of the pipe 10, as previously mentioned.

When inspecting different types of pipes having different wall thicknesses, the length of the time period $T_4$ during which a flaw signal may be expected to occur at flaw gate 45, FIG. 2, will be a function of the wall thickness since the length of the propagation path of the ultrasonic shear waves in the pipe wall is a function of wall thickness. To account for this, the time duration $T_4$ of the flaw gate pulse of FIG. 3k may be appropriately adjusted by the equipment operator by making an adjustment in the parameter value of a circuit component in the flaw gate multivibrator 43 of FIG. 2.

If for some reason a near surface reflection would not be received at receiving transducer 17, or in the event of a partial malfunction of the circuitry of FIG. 2 which would result in the failure of flip-flop 35 to be reset, the circuitry of FIG. 2 includes means for triggering flaw gate 45 by an artificially generated signal so that a true flaw signal received by transceiving transducer 14 still may be passed by flaw gate 45 to provide a proper readout to indicating apparatus coupled thereto. This feature permits continuation of the inspection operation so long as true flaw signals are in fact received by transceiving transducer 14.

The artificial triggering of flaw gate 45 is accomplished in the following manner. Assuming that a near surface reflected pulse were not received at receiving transducer 17, or that the circuitry would not properly function in response to a received near surface reflected pulse, flip-flop 35 would remain in its second stable state, as indicated by the broken line portion 72 of FIG. 3e. Therefore, the trigger circuit 41 would not be triggered by the output of flip-flop 35 and the pulse 63 of FIG. 3i would not be produced. It will be noted, however, that at that same time near surface gate 37 still is in its unstable state whose duration is $T_2$, FIG. 3h. The positive pulse of FIG. 3h is coupled through OR-gate 40 to trigger circuit 41 and the negative going trailing edge of the pulse actuates trigger circuit 41 so that the trigger pulse 64 shown in broken lines in FIG. 3i will be produced.

This artificially produced pulse 64 then will trigger delay monostable multivibrator 42 which produces the positive pulse of FIG. 3j. The trailing edge of the pulse of FIG. 3j actuates flaw gate monostable multivibrator 43 which produces the output waveform of FIG. 3k. Flaw gate 45 operates as previously described to pass a true flaw signal, FIG. 3m, if such flaw signal occurs during the time period $T_4$.

The artificially generated pulse 64 of FIG. 3i also is coupled over line 75 to the reset input terminal of flip-flop 35 to reset that circuit back to its first stable state, as illustrated by the broken line portion in FIG. 3e. Of course, if the near surface reflected pulse, FIG. 3f, had in fact been received, flip-flop 35 would have returned to its first stable state in response to the pulse of FIG. 3f and the trigger pulse 63 of FIG. 3i would have been produced and delay monostable multivibrator 42 would be actuated in the manner previously described. Therefore, the artificially generated pulse 64 of FIG. 3i would have no effect to actuate delay multivibrator 42 since it already would be in its unstable state.

The mode of operation involving the artificially generated pulse 64 of FIG. 3i is not an automatic tracking mode in the sense that the pulse 64 of FIG. 3i is not produced in response to a near surface reflected pulse of FIG. 3f. Instead, pulse 64 is produced at a fixed time delay after the occurrence of a transmitted pulse from transceiver transducer 14, the fixed time delay being established by the time periods $T_1$ and $T_2$ of FIGS. 3d and 3h.

It will be noted that the time period $T_3'$ of FIG. 3j is shorter than the time period $T_3$, FIG. 3j. This change in time period is made by the equipment operator by changing the time constants in the circuit of delay monostable multivibrator 42, and is done to avoid the possibility of missing a true flaw signal which might occur during the early portion of the gate pulse period $T_4$ of FIG. 3k, the period $T_4$ being the period during which a flaw signal is expected to be received. Because the second mode of operation, just described, is not self-tracking, it may be desirable to make the time period $T_4$ of FIG. 3k begin slightly earlier and end slightly later than illustrated. This will assure that no flaw signals will be blocked from flaw gate 45 due to variations in their times of occurrences resulting from wobble in the mechanical arrangement for rotating the transducer 14.

The operator of the equipment will know when the artificially generated pulse 64 of FIG. 3i is functioning to trigger delay multivibrator 42, which in turn initiates the opening of flaw gate 45, by observing the presentation on oscilloscope 50 and noting that the flaw gate is not sliding horizontally on the scope face, but instead is standing still. This results from the fact that the pulse 64 of FIG. 3i occurs at a fixed time each repetition period, rather than being a function of the wobble of transceiver transducer 14, as explained above.

From the above discussion it may be seen that the ultrasonic apparatus of this invention launches shear waves that propagate within the wall of pipe 10 and by the use of the receiving transducer 17, gated near surface reflections may be used to commence the gating operation for received flaw signals.

The circuitry of this invention has the further unique advantage that an artificial triggering pulse is generated to continue the proper operation of the circuit in the event that longitudinal waves are not reflected off inner surface 12 to receiving transducer 17, or in the event of a partial malfunction of the circuitry.

It will be understood that the practice of this invention is not limited to the inspection of tubular members such as pipes, but is equally useful for the inspection of other types of structural members. Accordingly, in the claims that follow the descriptive language will not be limited to that particularly associated with a pipe but will be more extensive.

What is claimed is:

1. Ultrasonic inspection apparatus for directing ultrasonic energy into a member to be inspected and for producing output signals only during that time when true flaw signals would be expected to occur, the apparatus comprising a source of recurring pulses, a first transducer coupled to said source of recurring pulses for producing corresponding pulses of ultrasonic energy, said transducer directing ultrasonic pulses along a single path that is oblique to a near surface of the member and also producing flaw pulses in response to received ultrasonic pulses reflected from flaws with said member, a second transducer located adjacent said near surface and disposed to receive pulses of ultrasonic energy transmitted by the first transducer along said path and reflected from the near surface, said second transducer producing near surface reflected pulses in response to the received ultrasonic pulses reflected from the near surface, means coupled to said source of recurring pulse for producing a gating pulse at a time after the occurrence of each transmitted ultrasonic pulse, each gating pulse having a time duration that includes the expected time of arrival at said second transducer of an ultrasonic pulse reflected from the near surface, a first gating means for gating each near surface reflected pulse that occurs simultaneously with a gating pulse, means responsive to near surface reflected pulses passed by the first gating means for producing corresponding flaw gating pulses, said flaw gating pulses having a time duration to include the expected time of arrival of a corresponding ultrasonic pulse received at the first transducer after having been reflected from a flaw in said member, a flaw gate coupled to said first transducer and controlled by said flaw gating pulses for passing flaw pulses from said first transducer, and output means responsive to the occurrence of flaw pulses passed by said flaw gate.

2. The combination claimed in claim 1 and further including, means operable in response to the termination of each of said first named gating pulses for initiating the triggering of the means for producing the flaw gating pulses in the event that the flaw gating pulses are not otherwise produced.

3. The combination claimed in claim 2 and further including a nonelastic ultrasonic energy-coupling medium disposed between said transducers and said near surface,
  said first transducer transmitting ultrasonic energy that propagates through the coupling medium in longitudinal waves,
  said first transducer being disposed relative to said near surface so that ultrasonic energy is incident on the near surface at an oblique angle to achieve mode conversion to ultrasonic shear waves in said member.

4. Ultrasonic inspection apparatus for directing ultrasonic waves into a member to be inspected and for producing output signals only during the time that true flaw signals are expected to be received after having been reflected from a flaw within the member, comprising
  a first transducer for transmitting ultrasonic energy along a single path into a member to be inspected and for receiving ultrasonic energy reflected from a flaw in the member,
  said transducer being disposed in spaced relationship to said member for transmitting ultrasonic energy propagating in longitudinal waves onto a near surface of the member at an angle of incidence to achieve substantial mode conversion of the ultrasonic energy into shear waves that propagate into the member,
  a second transducer disposed in spaced relationship from the member for receiving ultrasonic energy that is transmitted by the first transducer and reflected from said near surface,
  pulse-generating means for producing recurring electrical pulses for pulsing said first transducer,
  means coupled to said pulse-generating means for producing a first gating pulse at a fixed time delay after the occurrence of each ultrasonic pulse transmitted by the first transducer,
  first gating means coupled to said second transducer and also coupled to receive said first gating pulses, said gating means being gated by the gating pulses to pass only pulses from the second transducer that correspond to transmitted ultrasonic pulses reflected from the near surface,
  second gate pulse-generating means coupled to said first gating means for generating flaw gating pulses in response to pulses passed by said first gating means,
  flaw pulse gating means coupled to receive pulses from said first transducer and controlled by said second gate pulse-generating means to pass only pulses corresponding to pulses of ultrasonic energy reflected from a flaw in said member and received by said first transducer, and
  means providing an indication of flaw pulses passed by the flaw pulse gating means.

5. The combination claimed in claim 4 and further including means operable in response to the termination of each first gating pulse for triggering said second gate pulse-generating means in the event said second gate pulse-generating means has not been triggered by an output signal from said first gating means.

6. The combination claimed in claim 5 and including,
  means for varying the times of occurrence and the time durations of said flaw gating pulses.

7. Ultrasonic inspection apparatus for inspecting the wall of a longitudinally extending section of pipe, comprising
  first and second ultrasonic transducers disposed within said pipe in longitudinally spaced relationship,
  said first transducer being disposed relative to the inner surface of said pipe to propagate ultrasonic energy at an oblique angle onto the inner surface of the pipe, said angle being chosen so that a portion of the ultrasonic energy propagates into the wall of the pipe and a portion of the energy is reflected from the inner surface,
  the first transducer also receiving reflections of ultrasonic energy from flaws within the wall of the pipe,
  said second transducer being disposed relative to said inner surface to receive said ultrasonic energy reflected from the inner surface,
  a source of recurring pulses coupled to said first transducer whereby the first transducer transmits pulses of ultrasonic energy toward said inner surface,
  means coupled to said source of recurring pulse for producing a gating pulse at a time after the occurrence of each transmitted ultrasonic pulse, each gating pulse having a time duration that includes the expected time of arrival at said second transducer of an ultrasonic pulse reflected from the inner surface,
  a first gating means for gating each inner surface reflected pulse that occurs simultaneously with a gating pulse,
  means responsive to inner surface reflected pulses passed by the first gating means for producing corresponding flaw gating pulses,
  said flaw gating pulses having a time duration to include the expected time of arrival of a corresponding ultrasonic pulse received at the first transducer after having been reflected from a flaw in said member,
  a flaw gate coupled to said first transducer and controlled by said flaw gating pulses for passing flaw pulses from said first transducer, and
  output means responsive to the occurrence of flaw pulses passed by said flaw gate.

8. The apparatus claimed in claim 7 and further including,
  means for imparting a relative helical motion between said two transducers and the inner surface of said pipe, said two transducers maintaining a desired relationship to each other while passing through a given section of said pipe.

* * * * *